Figure 1:
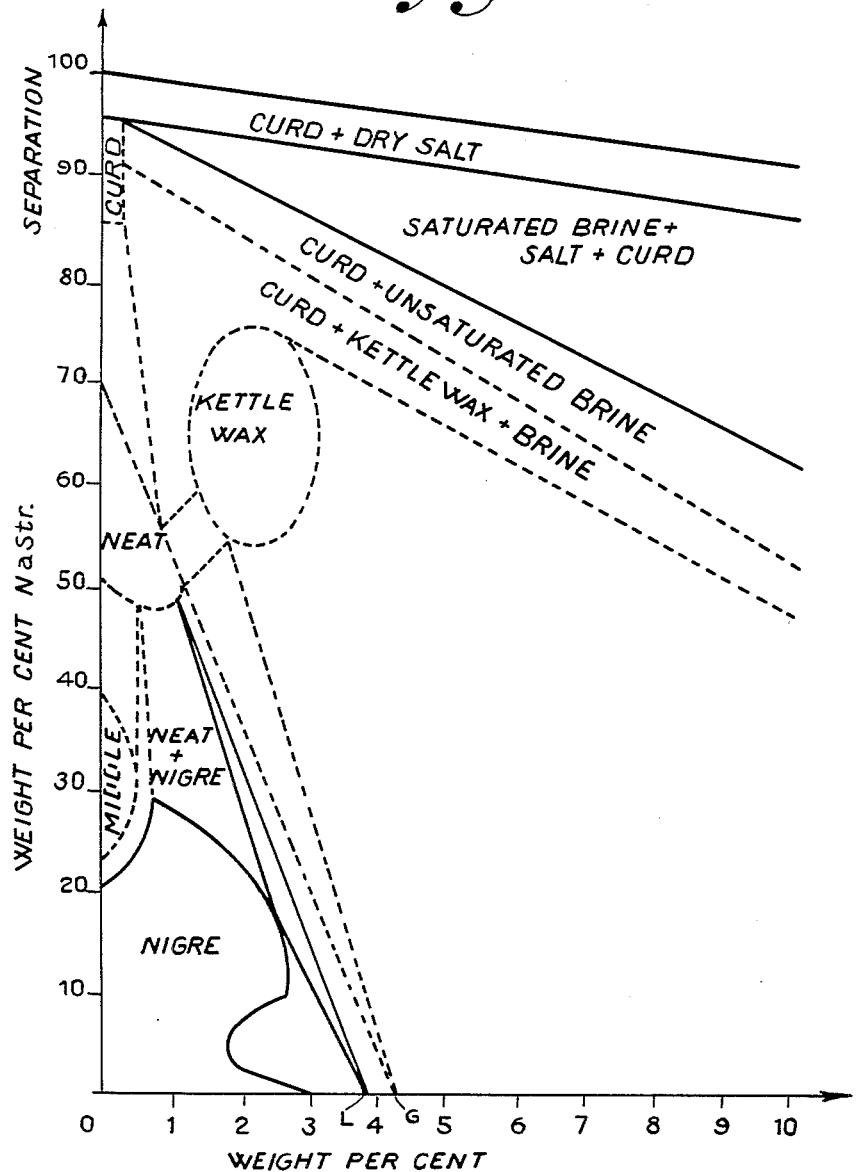

Dec. 13, 1955  F. L. LACHAMPT  2,726,937
APPARATUS FOR CONTINUOUS PRODUCTION OF SOAP
Original Filed Sept. 13, 1949  4 Sheets-Sheet 4
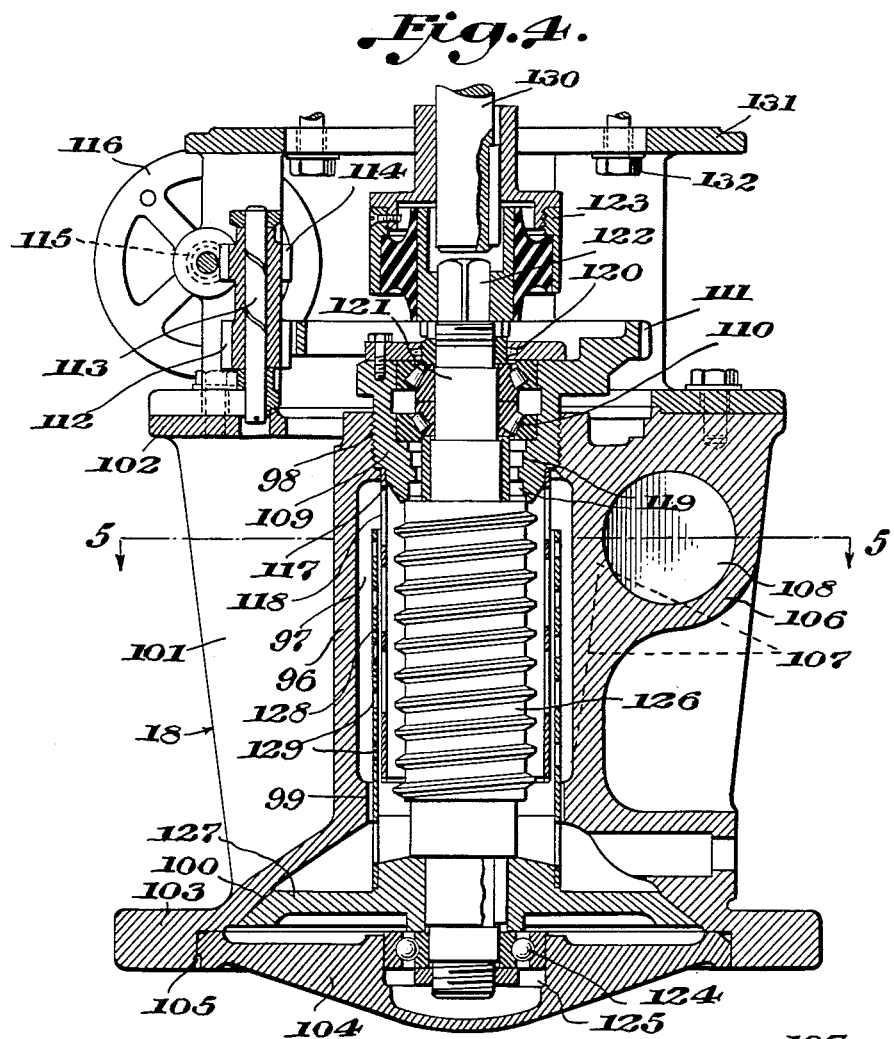
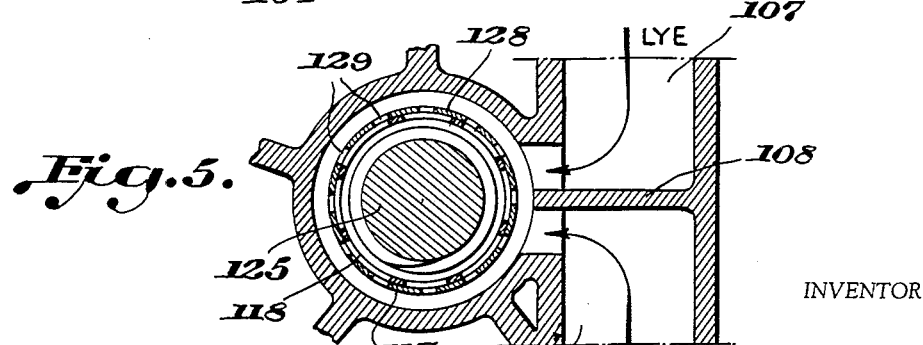
INVENTOR
F. L. Lachampt.
BY Wenderoth, Lind & Ponack
ATTORNEYS United States Patent Office 2,726,937
Patented Dec. 13, 1955

2,726,937
APPARATUS FOR CONTINUOUS PRODUCTION
OF SOAP

Felix Lucien Lachampt, Franconville, France, assignor to Union Française Commerciale et Industrielle, Casablanca, Morocco, a corporation of Morocco Original application September 13, 1949, Serial No. 115,536. Divided and this application April 19, 1951, Serial No. 221,789

4 Claims. (Cl. 23—260)

This application is a division of my application Serial No. 115,536, filed September 13, 1949, entitled "Method and Apparatus for Continuous Production of Soap," now abandoned.

The invention relates to an apparatus for obtaining the continuous saponification of fatty materials by an alkaline lye, particularly glycerides by a caustic solution, to obtain directly a saponified mass in the "neat" phase, as defined particularly by McBain and Lee in their study "Application of the phase rule to soap boiling" published in "Industrial and Engineering Chemistry" in August 1942, pages 917 to 921.

An object of my invention is to provide an apparatus for producing a substantially neutral soap.

A further object of the invention is to provide an apparatus for saponifying washing and purifying continuously a soap obtained directly in its "neat" condition.

According to the invention an alkaline lye having a concentration chosen as indicated below and a quantity of fatty material are mixed in a certain proportion so that the soap obtained has a free alkali content above 0.01% and preferably about 0.1%. An emulsion of the type "water in oil" is formed from the alkaline lye at about room temperature and preferably around 20° C. with the fatty materials at a temperature slightly above such as 2° C. above their melting temperature. The temperature of the fatty materials should be at least 20° C. This emulsion is dispersed and formed in less than 10 seconds, generally in 3 seconds, so that the droplets of dispersed caustic lye have a diameter of less than 2 microns at the outlet of the emulsifying apparatus. The dispersed emulsion flows by gravity into a saponification chamber under substantially atmospheric pressure and such chamber is maintained at a constant temperature between about 85 and 95° C., preferably at 90° C. where it is transformed into a saponified mass in the "neat" phase. This transformation is effected at a linear speed of 3 cm./minute at the hot point in the chamber maintained at 90° C. It takes place practically in less than 3 minutes.

An object of the invention is also the purification of the soap so obtained. For this purpose there is a first continuous washing of the "neat soap" by circulating in countercurrent a solution of sodium chloride whose concentration is selected as specified below. After mixing, more than 90% of this solution separates in less than 10 minutes by gravity alone which results in the elimination of the larger portion of the glycerine and impurities. Then a second washing of the soap is carried out with a caustic solution at a "limit" concentration defined below which gives after mixing and separation by gravity a soap free from sodium chloride and slightly alkaline. This soap is neutralized by mixing it with a fatty acid or with a neutral fat which reacts rapidly.

The saponification arrangement in accordance with the invention, in addition to means for distributing the fatty materials and alkaline lye under the conditions of temperature and in the desired proportions, comprises essentially:

1. An emulsifying or homogenizing apparatus fed by the distribution means designed to provide in less than 10 seconds, generally in 3 seconds or less, an emulsion in which the dispersed droplets of lye at the outlet of the apparatus have a dimension below 2 microns.

2. A reaction chamber with means for maintaining its temperature constant between 85° and 95° C., into which the emulsion formed by the emulsifier passes.

3. A receiving kettle for the saponified mass provided with an agitator and means for maintaining the temperature constant between 85° and 95° C.

The saponification arrangement outlined above develops a totally saponified mass in less than 5 minutes starting from the fats.

The washing arrangement disclosed herein comprises two groups of superposed washing stages with the soap circulating from bottom to top and the washing solution used in each group from top to bottom of the group. Each group is formed of several superposed stages which have an inlet for the soap and an outlet for the washing solution to the lower stage, an outlet for the soap and an inlet for the washing solution to the upper stage and means for circulating the soap from bottom to top and the washing solution from top to bottom across each stage. The circulation means includes a mixer connected to a soap inlet and to a washing solution inlet, and a decantation tank connected to the outlet from the mixer for receiving the soap mixed with the washing solution.

The neutralization arrangement is connected to the upper portion of the washing arrangement to receive the soap which is deglycerinated and free from impurities. It comprises a mixer into which the soap enters and an inlet conduit for the fatty body for the neutralization (fats, fatty acids).

The assembly of the washing and the neutralization arrangements comprises furthermore means for maintaining a constant temperature between 85° and 95° C. and this is generally accomplished as for the saponification step, by water maintained at a constant temperature circulating in a double walled casing.

Figure 2:
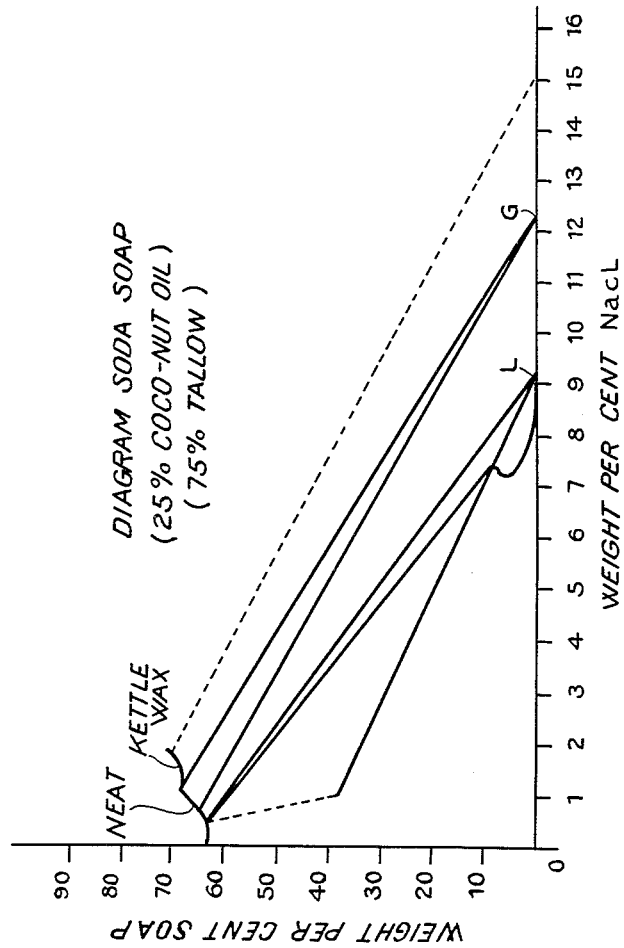
Figure 3:
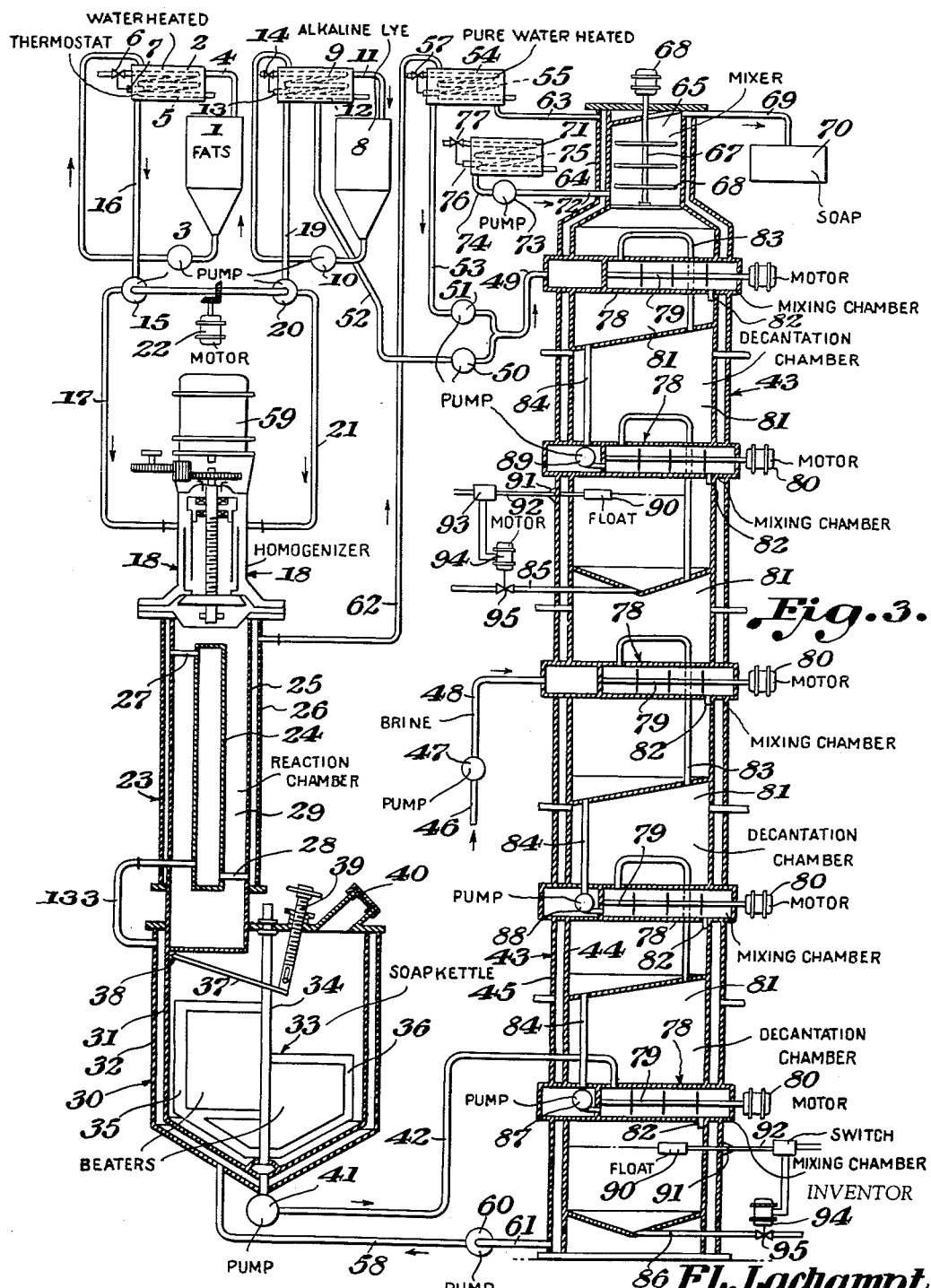

With the above and other objects in view which will become apparent from the detailed description below one method and apparatus for carrying out the invention, which is not to be construed in a limiting sense, is shown in the drawings in which:

Fig. 1 shows a diagram explaining the conditions of equilibrium of the phases of sodium stearate with a sodium chloride solution of various concentrations, Fig. 2 shows a similar diagram for a fat mixture comprising 25% coconut oil and 75% tallow mixed with solutions of sodium chloride of various concentrations, Fig. 3 is a diagrammatic view illustrating a saponification, washing and neutralizing apparatus, Fig. 4 is a vertical sectional view with parts in elevation and cut away illustrating a type of homogenizer which may be used, and Fig. 5 is a partial horizontal cross-sectional view on section line 5—5 of Fig. 4.

In the various figures similar reference characters indicate like parts.

The process of the invention carried out by the apparatus comprises three distinct phases: saponification, washing of the soap obtained, and then its neutralization.

An essential feature of the invention is to obtain immediately a soap in the "neat" phase. This requires the caustic concentration to be such that there is formed an emulsion of the type "water-in-oil."

For defining clearly the conditions of operation, reference is made to Fig. 1, showing the diagram of McBain and Lee. This diagram illustrates the conditions of equilibrium of the phases of sodium stearate with a sodium chloride solution for varying concentrations of said sodium chloride solution.

In Fig. 2, the equilibrium conditions are shown of the phases of a soda soap obtained from a fatty mixture including 25% of coconut oil and 75% tallow, and mixed in solutions of sodium chloride having varying concentrations.

The practical application of saponifying quickly fatty substances by emulsification with an alkaline lye presents a number of difficulties which have not been overcome heretofore. The factors which control a rapid and complete saponification are the following: the quantity and the concentration of the caustic soda lye, the temperature of the fatty substances and the lye, the type of the emulsion, the manner of preparation of the emulsion, and the degree of dispersion and the manner of bringing about the reaction in order to avoid a separation of the emulsion.

The concentration of the caustic soda should be such that an emulsion of the type water-in-oil is formed and the quantity of the caustic soda should be slightly in excess of the theoretic quantity necessary for securing a complete saponification of the fatty materials. An excess of caustic soda from 1 to 5% gives good results and such excess is usually preferably between 1 and 2%.

In industrial soap the content of fatty acids in the "neat" phase is generally between 60 and 65%. The concentration of soda lye to be used in the present process should be selected by taking account of the saponification index of the fatty materials and their content of free fatty acids. When there are no free fatty acids present the concentration of the soda lye should not go below 33% and may be up to 40%.

There is indicated upon the table below the concentrations that the soda lye should have according to the saponification index and the content of free fatty acids in the fats to be saponified.

| Saponification index | 182 | 196 | 210 | 224 | 238 | 252 |
|---|---|---|---|---|---|---|
| Percentage of soda corresponding | 13 | 14 | 15 | 16 | 17 | 18 |
| | Concentration of Soda Lye ||||||
| Percentage of Free Fatty Acids: | | | | | | |
| 0 | | 33 | 33 | 33 | 34 | 36 |
| 20 | | 27.5 | 29 | 31 | 33 | 35 |
| 40 | | 27 | 28 | 30 | 32 | 34 |
| 60 | | 25.5 | 27 | 28 | 30 | 32 |
| 80 | 23 | 24.5 | 26 | 27.5 | 29 | 31 |
| 100 | 22 | 23 | 25 | 27 | 28 | 30 |

The table above shows that the concentration of caustic soda lye should increase as the saponification index increases while it should diminish as the content of free fatty acids increases. In certain particular cases it is necessary that the concentration of the soda lye should go to 40%.

The temperature of the fatty substances must be at least 20° C. Generally, the temperature must be higher than the melting point of the fatty substances by a few degrees only, for instance 2° C. In practice, the soda lye is at room temperature, and it may be assumed that that temperature is about 20° C. It is desirable that the temperature of the fatty substances be more increased, the more their content of free fatty acids is high, because such free fatty acids instantaneously react and may cause the emulsion to "harden."

For a mixture of fatty bodies melting at 38° C. the temperatures that can be used advantageously are the following:

| Percent of free fatty acids: | Temperature, ° C. |
|---|---|
| 0 | 40 |
| 5 | 45 |
| 30 | 48 |
| 60 | 51 |
| 100 | 55 |

The emulsion must be prepared and dispersed to the proper degree, that is the diameter of droplets of lye dispersed in fatty materials should be less than 2 microns. The dispersion of the mixture of fatty bodies and alkaline lye should take place in a very short time, less than 10 seconds, and practically it generally takes place in 3 seconds for the following reasons: If no free fatty acids are present in a fatty substance, the emulsion obtained remains in a liquid condition for some minutes. If, however, the content in free fatty acids is increased in the fatty substances, the emulsion may "harden" quickly and therefore the emulsion must be drawn quickly from the homogenizing apparatus. Thus, in the case of dispersions containing droplets of lye having a size less than 2 microns, the reaction sets in after starting at a linear speed of about three centimeters per minute. Therefore the most suitable type of homogenizer for carrying out the invention comprises a pair of closely spaced parallel surfaces displaced with a high tangential speed relative to one another, such surfaces dispersing and throwing out the emulsion, which is caused to flow into a reaction chamber maintained at a temperature between 85° and 95° C. Due to the quick propagation of the reaction, no danger is to be feared of a "breaking" of the emulsion under such conditions.

The soap in "neat" phase, that is obtained by carrying out the saponification conditions of the process according to the present invention, as indicated above, must frequently for commercial usage be deglycerinated and purified in order to eliminate the protein materials from the fats and the soaps of oxidated acids as well as other impurities.

The saponified mass in its "neat" phase is washed with a solution of sodium chloride, and then with a solution of soda lye (NaOH), the concentrations of said solutions being chosen in such a way that, the neat soap, after having been mixed with such solutions, separates by gravity while remaining still in its "neat" phase.

Herein the term "limit" lye or "limit washing solution" for a "neat" soap means a solution of sodium chloride or a solution of caustic soda or a mixture of these two solutions in any proportions whatsoever, having a concentration such that when mixed with soap in the "neat" phase, the soap separates entirely from such washing solution without being dissolved thereby while a solution of a slightly lower concentration than such "limit" concentration would dissolve this same soap. In other words the washing solution after its mixture with the "neat" soap and separation from the neat soap takes a concentration equal to the "limit" concentration. It may also be said that a washing solution having a concentration below such "minimum" or "limit" lye will dissolve a portion of the soap when it is placed in the presence of neat soap, thus giving a mixture of "neat" soap and nigre.

Referring to the diagrams of Fig. 1 and Fig. 2 relative to the equilibrium of the phases of a soap in the presence of a solution of sodium chloride, the concentration of the "limit" lye corresponds to the point L. This concentration can be easily obtained by test since it is a well defined physicochemical constant for each soap or mixture of soaps.

The equilibrium diagrams of a soap in the presence of a solution of caustic soda or a mixture of a solution of sodium chloride and a solution of caustic soda have an analogous form to that shown upon Figs. 1 and 2.

In practice the washing operations are carried out with a washing solution in equilibrium with the "neat" soap having a concentration between the points L and G. As a matter of fact, it is seen from the diagrams that a solution having the "G" concentration remains in equilibrium with "neat" soap and kettle wax simultaneously. If a solution having a concentration higher than defined by the point G in the diagrams is used, however, the neat soap granulates, that is becomes kettle wax. The choice of a suitable concentration for the washing solution is an important feature of the invention, since such choice permits securing a quick washing of the "neat" soap, and its separation from the washing solution by gravity alone. If a washing solution having too high a concentration should be used, on the contrary, a granulated soap in the "kettle wax" phase would be obtained, which would retain some or all of the solution and would require the application of centrifugal action to be separated from the retained portion of the solution. Moreover, the elimination of impurities is far less complete.

Thus washing solutions are chosen, having concentrations between the concentration of the "minimum" lye or "limit" lye and 1.15 times such concentration. Under such conditions, the washing solution remains in equilibrium with the "neat" soap and a complete separation is obtained by gravity alone in a time less than 15 minutes.

The concentration of the "minimum" or "limit" lye may be determined by experiment. Two parts of "neat" soap and one part of a washing solution, such as a brine, are placed in small beakers in a water bath. In each beaker a solution having a known concentration different from the concentration of the solutions in the other beakers is placed. The mixtures in the beakers are stirred, and that washing solution is chosen, which does not dissolve the soap, and which has a concentration slightly greater than that solution in the series in which some of the "neat" soap is dissolved.

The improved method and an apparatus for carrying the same into effect will now be described.

An alkaline lye is prepared, having the "limit" concentration, as hereabove defined, and is mixed with fatty substances, in such an amount that the proportions of fatty acids, alkali and water, respectively, correspond with the stoichiometric proportions for the desired "neat" soap. More specifically, an alkaline lye at room temperature, preferably about 20° C., is emulsified with a fatty substance having a temperature slightly greater than the melting point thereof, by 2° C., for instance, an emulsion of the type "water in oil" is produced and dispersed rapidly, in such a way that the suspended droplets of lye have a size less than two (2) microns, when flowing out from the emulsifying apparatus. The dispersed emulsion is circulated in a chamber kept substantially at atmospheric pressure and whose walls are heated to a constant temperature within the range 85° C. to 95° C., say 90° C., whereby an almost instantaneous saponification occurs giving a saponified mass in its "neat" phase.

In a preferred modification of the method, the amount of alkali is made greater than the quantity required for a complete saponification by 1% to 2%, the "neat" soap thus obtained being slightly alkaline containing 0.01 to 0.1% alkali when the soap is washed. The "neat" soap is subjected to a first washing operation by counter-flowing a solution of sodium chloride having a concentration which is in equilibrium with the "neat" soap. In this manner the major portion of glycerine and impurities are separated by gravity only. Then the soap is washed in counter-flow by a solution of caustic soda, having a concentration in equilibrium with the "neat" soap when intimately mixed therewith, whereby a soap without any sodium chloride is obtained and which is slightly alkaline. This soap is then neutralized by mixing with a neutral fatty acid, which is saponified rapidly by the alkali present in excess in the "neat" soap. Or the soap is mixed with a substance of any well-known type acting as a buffer enabling the pH value of the soap to be kept near the neutral value.

An apparatus for carrying out the above-mentioned method comprises in combination saponification, washing and neutralizing devices, as will be explained below in fuller detail:

The saponification arrangement comprises in combination, means for supplying fatty substances and alkaline lye respectively having the required temperature and proportion conditions. An emulsifying apparatus is fed from the above-mentioned means and is adapted to produce an emulsion of the type "water in oil" within a period of less than one minute and preferably some seconds. Upon flowing from the emulsifying apparatus, the emulsion contains dispersed droplets of lye whose size is less than two (2) microns and preferably below 1 micron. The arrangement further comprises a reaction chamber fed from the emulsifying apparatus and means associated with the reaction chamber for maintaining the inner temperature thereof at a constant value between 85° and 95° C. There is provided a receiving tank or kettle for the saponified mass, provided with stirrer means and with means for maintaining a constant temperature between 85° and 95° C. therein.

Such a saponification arrangement enables a saponified and glycerinated mass to be obtained, which may be subjected to further well-known operations, such as the addition of perfumes, super-fatters, pharmaceutical products, or molding or chilling for immediate use.

The washing arrangement following the above described saponification comprises in combination two series of superposed washing stages, means for causing the soap to flow upwardly from the lowermost stage, and means in each series for flowing the related washing solution downwardly from the uppermost washing stage in the series. Each of said series includes a plurality of superpose washing stages and includes means for feeding soap to, and drawing off the washing solution from the lowermost stage in the series, means for circulating the soap and the washing solution through said stages in reverse directions with respect to each other, and means for drawing off soap from, and feeding washing solution to the uppermost stage of the series. Finally, each stage in each series comprises a mixer, an input pipe for soap connected thereto, an input pipe for washing solution also connected thereto, and a decantation tank or kettle fed from said mixer in the related stage for receiving the mixture of soap with washing solution for decantation therein.

The neutralizing agent is connected to the upper end of the washing arrangement and receives therefrom a "neat" soap free from glycerine and impurities. The neutralizing arrangement comprises a mixer, means for feeding soap to such mixer and means for feeding a neutralizing substance to the mixer, such as a fat, a fatty acid or any well-known buffer composition.

The neutralizing arrangement also comprises means for maintaining a constant temperature therein within the range of 85° to 95° C. Preferably, such means include means for circulating water at constant temperature in a double outer wall, and similar means are used preferably in the saponification arrangement for heating the reaction chamber and the receiving tank thereof.

Preferably the emulsifying and homogenizing apparatus comprises a vertically arranged, cylindrical housing having a vertical shaft journaled for rotation at its opposite upper and lower ends, respectively, said shaft extending along the vertical axis of the housing. At its lower end, the shaft carries a frustroconical disc member having an under surface of greater area than the upper surface thereof, the frustroconical surface of the disc member is housed in a casing of similar shape secured to the lower end of the housing, and control members are provided for varying the gap between the outer and inner frustroconical surfaces of the casing and the disc member, respectively. The frustroconical surfaces are rotated relative to each other. Helical grooves are cut or formed in the disc-holding shaft, and driving means are provided for rotating said shaft with a speed amounting to many thousands R. P. M. in such a direction that said helical grooves impart a downwardly directed movement to a fluid mass in the housing. Also, a cylinder coaxial with the shaft and the housing is made of perforated sheet metal and is secured to the upper surface of the frustroconical disc member to be rotated therewith. On the other hand, the enclosing housing supports a coaxially arranged cylinder made of perforated sheet metal and coaxially mounted within the first-mentioned rotatable cylinder and closely spaced therefrom. The rotatable cylinder is given as great a diameter as possible, and thus extends closely to the inner wall of the enclosing housing. The fatty substances and the lye are fed between the enclosing housing and the rotatable cylinder. In this manner these substances are squeezed through the fixed and rotatable perforated cylinders and are driven downwardly thereafter by the helical grooves in the axial shaft. Then both substances are further emulsified and dispersed between the frustroconical surfaces of the disc member and the casing respectively, whose spacing is controlled to obtain dispersed droplets of lye in the fatty substance with a diameter between .5 and 2 microns.

Preferably, the reaction chamber is in the shape of a vertical annular ring having a casing extending along its vertical axis and surrounded by a double outer wall coaxial with the casing and communicating therewith. Hot water is fed through the central casing and the outer double wall at a temperature within the range 85° to 95° C., thus maintaining the desired temperature within the reaction chamber.

The invention will be better understood from the following detailed description of an embodiment for illustration purposes only, and not constituting any limitation thereof, in connection with Figs. 3, 4 and 5.

There is shown diagrammatically upon Fig. 3 an apparatus for the saponification, for the washing and for the neutralization of the soap.

The fats are stored in a reservoir 1 from which they are fed to a tank 2 by a pump 3. The tank 2 preferably has a capacity corresponding to about the consumption of fats for a ninety minute operation of the apparatus. The tank 2 has an overflow pipe 4 which returns excess fats in tank 2 to the reservoir 1. A heating arrangement 5, shown schematically, is controlled by a valve 6 which is in turn controlled by a thermostatic device 7. The alkaline lye is stored in a reservoir 8 and is fed to a tank 9 by a pump 10. The tank 9 is also designed to hold a supply allowing the operation of the installation for about ninety minutes. It has an overflow pipe 11 which returns excess lye to the reservoir 8. The tank 9 is provided with heating means 12 under the control of a thermostat 13 and a heating regulating valve 14.

The fats are withdrawn from the tank 2 by a pump 15 through a pipe 16 and led by a pipe 17 into the homogenizer 18. The alkaline lye is drawn from the tank 9 through a pipe 19 by a pump 20 and then into a pipe 21 which leads to the homogenizer or emulsifier 18.

Both pumps 15 and 20 are of the variable flow type, and in this manner the relative proportions of flow of fats and alkaline lye, respectively, may be maintained to the desired value with a maximum variation of the order of 1%. Preferably the pumps 15 and 20 are of the variable flow volumetric type including a very strongly built plunger piston. Preferably also both pumps 15 and 20 are driven from a common motor 22 so that stopping of one pump only is prevented, which would be detrimental to the correct relative proportions of both components. It is necessary that the pumps 15 and 20 be provided with suitable filtration devices, in order that no grit may pass therethrough, which would hinder the operation of the valves and also a pressure head will be applied to said pumps by spacing them under the related tanks 2 and 9 at least one meter. Finally, the flow through the pumps 3 and 10 is maintained greater than the flow through the pumps 15 and 20, respectively so that fats and alkaline lye will overflow at all times in the overflow pipes 4 and 11, respectively, and in this manner the fats will be stirred continuously in the reservoir 1 and in the tank 2, while the alkaline lye will be stirred continuously in the reservoir 8 and in the tank 9.

The homogenizing apparatus 18 will be described below in fuller detail. This apparatus is arranged at the upper end of a vertical reaction chamber 23 comprising a cylindrical interior casing 24 and a coaxial outer double walled casing 25, 26, the interior of which communicates with the interior of the casing 24 by means of tubes 27 and 28. The reaction chamber proper is formed by the annular space 29 between the casing 24 and the inner wall 25 and the emulsion from the homogenizing apparatus 18 is projected into this annular space.

The chamber 29 communicates at its lower end with a cylindrical-conical kettle 30 having a double outer wall 31, 32 connected with the casing 24 through a pipe 133. A stirring apparatus 33 is provided having a driving shaft 34 journalled in the kettle 30 and comprises frames 35, 36 provided with arm extensions. This assembly is rotated by a driving mechanism (not shown). A shutter 37 is adapted to be swung about its end 38 by means of a handwheel 39 fixed to a screw arrangement. An inspection hole 40 is closed by a transparent plate, and the descent of the saponified mass from the chamber 29 on the shutter 37 may be observed through such transparent plate.

The saponified mass is evacuated at the bottom end of the kettle 30 by a variable flow volumetric pump 41 which feeds the mass through a pipe 42 into a washing tower 43 having a double walled casing 44, 45. A pipe 46 feeds the sodium chloride solution to a variable flow volumetric pump 47 which forces it through a pipe 48 into the tower 43.

A pump 50 supplied with lye from tank 9 through pipe 52 forces the lye through the pipe 49 into tower 43 and water is also supplied to pipe 49 by a pump 51. These two pumps have an adjustable volumetric flow. Water is fed to the pump by pipe 53 from a tank 54.

The tank 54 is provided with heating means 55 such as a steam coil for example with a thermostat 56 controlling a valve 57. A pipe 61 at the bottom of the tower 43 communicating with the interior of the double walled casing 44, 45 supplies the water circulating therein to a pump 60 which forces it through pipe 58 to the interior of the double walls of kettle 30. From here the water passes by pipe 133 to casing 24 and between walls 25 and 26 to pipe 62 to tank 54 from which it leaves by a pipe 63 into the annular space 64 surrounding a mixer 65.

The mixer 65 is provided with horizontal arms 66 and its vertical shaft 67 rotates in the upper portion of the tower 43. The mixer 65 is driven by a motor 68. The pipe 69 constitutes a discharge tube for the washed and neutralized soap and a storage tank 70 is provided for such soap from which it may be supplied to various conventional finishing operations of known type not shown.

A tank 71 contains a neutralizing substance for a slightly alkaline "neat" soap. This substance may be a fatty acid, a neutral fat, a buffer mixture or an ester of a fatty acid, for example. The neutralizing substance is fed to the mixer 65 through a pipe 72 from a variable flow, volumetric pump 73 which is itself fed by a pipe 74 from tank 71. Heating means 75 is provided for the tank 71 controlled by a thermostatic device 76 controlling a valve 77.

The tower 43 has five washing stages of which three washing stages are for washing the soap with a sodium chloride solution, and two washing stages are for washing the soap with an alkaline lye. Each washing stage comprises a mixer 78 having a horizontally extending shaft 79 driven by a motor 80. Each mixer 78 communicates with a decantation tank 81 immediately below the mixer concerned by a tubing 82 to supply the mixed product to such decantation tank. The soap passes from each decantation tank 81 to the mixer 78 in the next upper stage through a pipe 83. The washing lye used in the two uppermost stages of the tower 43 is drawn off through a pipe 85. The sodium chloride solution used is drawn off from the tower 43 through a pipe 86.

The washing solution is fed from a decanting tank 81 to the mixer 78 of the stage immediately thereunder by means of a variable flow, volumetric pumps as indicated at 87, 88 and 89.

A pair of float members 90 are provided, each having a specific gravity between the specific gravity of the washing solution and the specific gravity of the washed soap in the related stage. The float members 90 are arranged in the lowermost washing stage for the sodium chloride solution and in the lowermost washing stage for the alkaline lye solution, respectively. Each float 90 oscillates a lever 92 about a related axis 91. The levers 92 each control a switch 93 for supplying current to an electric motor 94 for opening or closing a valve 95.

The emulsifying apparatus 18 (Figs. 4 and 5) comprises a housing 96 forming a cylindrical chamber 97. The housing 96 has a threaded portion 98, a cylindrical portion 99 of restricted diameter and a frustoconical portion 100. The various elements are carefully machined to accurately predetermined dimensions. Reinforcing ribs 101 are provided between the upper flange 102 and the lower flange 103 of the housing. A hub-carrier 104 in the shape of a wheel, with radially projecting arms and a central solid portion is attached to the lower flange 103 and coaxially therewith by any suitable means such as countersunk screws 105 screwed partly in the bore of the flange 103 and partly in the outer cylindrical surface of the member 104. The members 103 and 104 are tightly fitted together. An enlarged portion 106 is formed in the housing 96 with a cylindrical duct 107 therethrough having a transverse partition 108 therein. The duct 107 is connected with the pipe 17 at one end, and with the pipe 21 at the other end thereof, for feeding fatty substances and alkaline lye, respectively, into the cylindrical chamber 97.

An upper hub 109 contains the races for the two conical roller bearings 110. The hub 109 is exteriorly threaded to fit the threading 98 in the housing 96. The hub 109 also is formed with teeth 111 which mesh with a pinion 112 rotatively mounted on a shaft 113 supported from a support fixed to the flange 102. The pinion 112 is integrally connected with a helical gear 114 meshing with a worm gear 115 which may be rotated by a hand-wheel 116 fixed to the shaft carrying gear 115.

A metal cylinder 117 provided with perforations 118 is attached to the hub 109 by any suitable means. Packings 119 and 120 prevent emulsion and grease from being projected.

The rotating elements in the emulsifying machine are mounted on a shaft 121 having an upper end 122 of square cross-section for driving the shaft 121 by an elastic clutch member 123. The shaft 121 is journalled in the bearings 110 at its upper end and in a ball bearing 124 at the lower end thereof. The ball bearing 124 is slidable axially in a recess 125 provided in the lower hub 104. A helical thread forming a helical groove 126 is formed on the shaft 121 and a frustoconical plate 127 is keyed to the shaft 121 at the lower end. The outer periphery of the plate 127 corresponds to that of the frustoconical portion 100 formed in the housing 96.

The arrangement described allows, by turning the wheel 116, to establish a desired spacing between the truncated conical surface 100 of the housing and the truncated conical surface of the plate 127. A rotation of the upper hub 109 causes the assembly of elements carried by the shaft 121 to ascend or descend.

A cylinder 128 is secured coaxially to the plate 127, at the upper surface thereof, by any suitable means. This cylinder 128 is made of sheet-metal and provided with perforations 129. The outer diameter of the cylinder 128 is positioned as close as possible to the housing at the restricted portion 99.

A motor 59 (see Fig. 3) is provided with a driving shaft 130 and is mounted on a platform 131 by means of bolts 132.

The following example illustrates how the method may be carried out by using the above described arrangement. It is assumed in such example that a "neat" soap is to be produced starting from a mixture of fats including 75% tallow and 25% coconut oil, said mixture having a content of free fatty acids equal to 20% and having a saponification index of 210.

The fats are maintained in the tank 2 at a constant temperature of about 47° C. Preferably the reservoir 1 and the tank 2 are made of a metal which does not react with the fats so that no color is given to the stored fats from the metal of the tanks. For instance, use may be made of stainless steel or aluminum for reservoir 1 and the tank 2. The caustic soda lye is kept at a 20° C. temperature due to the automatic temperature control arrangement described. The soda concentration is chosen equal to 29%, as given by Table 1 above which indicates the concentration of lye to be used depending on the saponification index and the fatty acid content of the used fat.

100 parts by weight of the fat mixture, and 52.3 parts by weight of the caustic soda lye at a 29% concentration are fed simultaneously to the chamber 97 through the pipes 17 and 21, respectively. Both products enter the emulsifying machine through the parts 107. The shaft 121 of the emulsifying machine is rotated with a speed of about 3,000 R. P. M., and in such direction that the helical groove 126 in the shaft 121 drives the mixture towards the frustoconical plate 127. This mixture has been squeezed first between the fixed cylinder 117 and the rotating cylinder 128. The spacing between the frustoconical surfaces 100 and 127 has been adjusted to give a clearance amounting to a few hundredths of a millimeter. A device of well-known type, including a micrometric screw (not shown) is used, and is attached to the handwheel 116 for controlling accurately the position of the plate 127. In one particular embodiment, the plate 127 had a diameter of 32 centimeters, and the peripheral speed of the plate 127 amounted to about 50 meters per second. At the output end of the homogenizing machine 18, an emulsion is obtained in which the droplets of lye dispersed in the fatty substances have a size within .5 and 2 microns, while the mixture passes through the apparatus in less than 3 seconds. Obviously any other apparatus giving the same results in a correspondingly short time could be used instead of the described apparatus.

The emulsion obtained passes into the reaction chamber 23 and through the annular space 29, the distance between the casing 24 and the inner wall 25 being 6 cm. The heating water circulated at a constant temperature of about 90° C. by the pump 60 through the double walled casings of the kettle 30 and the chamber 23 maintains the chamber 23 at a temperature favorable for the beginning of the reaction.

The shutter 37 is used for reducing the rate of falling of the soap, which is observed by a worker through the inspection opening 40 by means of a convenient lighting arrangement (not shown) arranged within the chamber. Care is taken that the reaction chamber 23 is maintained at least half filled. The shutter 37 also acts as a hydraulic joint preventing the entry of air into the reaction chamber 23, since the pressure within the reaction chamber 23 substantially equals atmospheric pressure. The shutter 37 is maintained normally in a substantially constant position and is only displaced slightly when the viscosity of the soap changes.

The reaction may be started also by projecting dry steam under the frustroconical plate 127. Such an arrangement, however, requires that water be circulated around the reaction chamber 23 in order to maintain the temperature thereof at a constant value since the saponification reaction is greatly exothermic and any boiling must be avoided. The reaction, when started, proceeds to completion without needing any external heat. The emulsion preliminarily whitish is transformed into a homogeneous translucent mass.

The soap passing into the kettle 30 is in its "neat" phase and comprises 62.3% fatty acids and .1% of free soda.

This soap is first washed with a sodium chloride solution in the three lower stages of the washing tower 43. The solution used has a 11% NaCl concentration. Generally, use is made of a solution from which the gases have been preliminarily removed and whose concentration is comprised within the range 10% to 12% at a temperature of about 90° C. The brine is introduced in the mixer 78 in the third washing stage by means of the variable flow, volumetric pump 47, in a proportion of 76.15 parts in weight for 152.3 parts in weight of soap introduced in the mixer 78 in the lowermost washing stage.

The washing solution decanted in the decantation tanks 81 successively passes through the stages under the action of the variable flow, volumetric pumps 87 and 88, respectively. The flow through such pumps is so controlled as to be slightly higher than the flow through the pump 47, and amounts to about 80 parts by weight.

Thus the soap and the sodium chloride solution are passed through the washing stages in counter-flow. The products are mixed in the mixer 78 in each stage, then the mixture is decanted in the decantation tank 81 in the same stage, then the washing solution passes to the next lower stage and the soap passes to the next upper stage. The washing solution removes glycerides and impurities from the soap.

The brine containing glycerine and impurities which separates in the decantation tank 81 in the lowermost washing stage is drawn off automatically through the pipe 86, the valve 95 of which is controlled by the float device 90. The control of the valve 95 may be of any well-known electrical or pneumatic type. When drawn from the lowermost decantation tank 81, the brine contains 9.12% NaCl and 0.19% NaOH.

The washed soap, when flowing out from the third washing stage in the tower 43, contains still a certain amount of salt. Its composition amounts to about 64% fatty acids and .7% salt. In order to eliminate the salt, the soap is then washed in both upper stages in the tower 43 by means of a caustic soda solution of a concentration containing 10% NaOH by weight. The soap is not dissolved by such a solution. As for the NaCl solution, occluded gases are removed thoroughly from the caustic soda solution.

The washing lye is fed to the tower 43 by means of the combined action of the variable flow, volumetric pumps 50 and 51. The concentrated lye is taken at a temperature of 20° C. and mixed with pure water at a temperature of 90° C. to give the washing solution. The temperatures of this mixture, however, is maintained at 90° C., due to the fact that the concentrated brine becomes diluted in water while supplying dilution heat.

The soap and washing lye pass through the tower in counter-flow, as in the lower stages. The used washing lye is taken from the decantation tank in the fourth stage in the tower (from the bottom of said tank), by the action of a float device 90 similar to the device 90 for the lowermost stage in the tower.

Care is taken that a pressure slightly greater than atmospheric pressure exists in the various washing stages, whereby any penetration of air is avoided.

The soap washed with the caustic soda solution, when flowing into the mixer 65, has an almost zero content of glycerine. Its salt content amounts to about .1% and its soda content is about .7%.

The used washing lye flowing through the output pipe 86 comprises substantially 8.65% NaOH and 1.17% NaCl by weight.

194.5 parts by weight of soap flowing in the mixer 65 are mixed with 7.8 parts by weight of a mixture of distillated fatty acids having a saponification index of 210. These fatty acids are stored in a storage tank 71 at a temperature of 80° C., and flow through a pipe 74 under the action of a variable flow, volumetric pump 73 inserted therein. From the pump 73 a pipe 72 leading to the lower end of the mixer 65 feeds the fatty acids thereinto. The quantity of fatty acids is determined in such a way, that the finished soap has only the required amount in free alkali. Instead of fatty acids, a neutral fat may be used, since the saponification occurs very quickly under the operating conditions.

Finally the finished soap flows through the pipe 69 to the storage tank 70 and has the following composition at that time:

| | Percent |
|---|---|
| Fatty acids | 65.2 |
| Salt | .10 |
| Free caustic soda | .10 |

It is well understood that various modifications may be made herein by additions or improvements of the apparatus described without departing from the spirit of the present invention.

Particularly, it is possible to modify the number and the arrangement of the washing stages.

I claim:

1. In an apparatus of the class described for the continuous production of purified soap, an emulsifying device comprising an outer cylindrical housing, a rotatable shaft coaxial with said housing, helical grooves extending along the outer cylindrical surface of said shaft, bearing surfaces for said rotatable shaft adjacent both upper and lower ends of said housing respectively, means to rotate said shaft and cause a screw-like displacement of said helical grooves with respect to the bottom of said housing, means to shift said shaft axially in said housing, a frustro-conical plate member coaxial with said shaft secured to the lower end of said shaft, said plate member having an upper surface of lesser area than the under surface thereof, a frustro-conical bottom portion in said housing having a conical surface which is substantially parallel to the outer surface of said frustro-conical plate member and coaxial therewith, a first perforated cylinder secured to said frustro-conical plate member along the periphery of the upper surface thereof to extend upwardly therefrom in close relationship to the inner diameter of said housing, a second perforated cylinder coaxial with said first cylinder attached to the upper wall of said housing and spaced within said first cylinder at a close distance therefrom and means to feed a fat-like material and an aqueous material through the wall of said housing and between the inner surface of said housing and the outer surface of said first perforated cylinder.

2. An emulsifying machine comprising an outer cylindrical housing, a rotatable shaft coaxial with said housing, helical grooves extending along the outer cylindrical surface of said shaft, bearing surfaces for said rotatable shaft adjacent both upper and lower ends of said housing, respectively, means to rotate said shaft and cause a screw-like displacement of said helical grooves with respect to the bottom of said housing, means to shift said shaft axially in said housing, a frustro-conical plate member coaxial with said shaft secured to the lower end of said shaft, said plate member having an upper surface of lesser area than the under surface thereof, a frustro-conical bottom portion in said housing having a conical surface which is substantially parallel to the outer surface of said frustro-conical plate member and coaxial therewith, a first perforated cylinder secured to said frustro-conical plate member along the periphery of the supper surface thereof to extend upwardly therefrom in close relationship to the inner diameter of said housing, a second perforated cylinder coaxial with said first cylinder attached to the upper wall of said housing and spaced within said first cylinder at a close distance therefrom and means to feed a fat-like material and an aqueous material through the wall of said housing and between the inner surface of said housing and the outer surface of said first perforated cylinder.

3. In an apparatus of the class described for the continuous production of purified soap, the combination of an emulsifying device and a washing device adapted to saponify and purify soap formed by the reaction of a fatty material with aqueous alkali, said emulsifying device comprising an outer cylindrical housing, a rotatable shaft coaxial with said housing, helical grooves extending along the outer cylindrical surface of said shaft, bearing surfaces for said rotatable shaft adjacent both upper and lower ends of said housing, respectively, means to rotate said shaft and cause a screw-like displacement of said helical grooves with respect to the bottom of said housing, means to shift said shaft axially in said housing, a frustro-conical plate member coaxial with said shaft secured to the lower end of said shaft, said plate member having an upper surface of lesser area than the under surface thereof, a frustro-conical bottom portion in said housing having a conical surface which is substantially parallel to the outer surface of said frustro-conical plate member and coaxial therewith, a first perforated cylinder secured to said frustro-conical plate member along the periphery of the upper surface thereof to extend upwardly therefrom in close relationship to the inner diameter of said housing, a second perforated cylinder coaxial with said first cylinder attached to the upper wall of said housing and spaced within said first cylinder at a close distance therefrom and means to feed a fat-like material and an aqueous material through the wall of said housing and between the inner surface of said housing and the outer surface of said first perforated cylinder, and said washing device comprising a vertical tower having spaced double walls, means for introducing the fluid soap from said emulsifying device into said tower, means for introducing a washing liquid into said tower, circulating and mixing means for said fluid soap and said washing fluid, means for settling said washing fluid from said washed fluid soap and means to separate said washing fluid and said washed fluid soap from said tower.

4. The combination of an emulsifying device and a washing device as set forth in claim 3, wherein said tower is subdivided into a series of washing compartments arranged in sequence.

References Cited in the file of this patent

UNITED STATES PATENTS

| Number | Name | Date |
|---|---|---|
| 362,856 | Riviere | May 10, 1887 |
| 2,150,733 | Thurman | Mar. 14, 1939 |
| 2,192,094 | Moore | Feb. 27, 1940 |
| 2,245,536 | Thurman | June 10, 1941 |
| 2,322,791 | De Back | June 29, 1943 |
| 2,348,855 | Scott | May 16, 1944 |
| 2,362,734 | Ward | Nov. 14, 1944 |
| 2,375,730 | Caldwell et al. | May 8, 1945 |
| 2,401,756 | Gunther | June 11, 1946 |
| 2,452,724 | Bradshaw | Nov. 2, 1948 |
| 2,475,605 | Prutton et al. | July 12, 1949 |